United States Patent
Gao

(10) Patent No.: US 11,788,923 B2
(45) Date of Patent: Oct. 17, 2023

(54) METHOD FOR DETECTING GAS TIGHTNESS OF FURNACE TUBE DEVICE

(71) Applicant: CHANGXIN MEMORY TECHNOLOGIES, INC., Hefei (CN)

(72) Inventor: Zhipeng Gao, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 155 days.

(21) Appl. No.: 17/444,597

(22) Filed: Aug. 6, 2021

(65) Prior Publication Data

US 2022/0205864 A1 Jun. 30, 2022

Related U.S. Application Data

(63) Continuation of application No. PCT/CN2021/095470, filed on May 24, 2021.

(30) Foreign Application Priority Data

Dec. 30, 2020 (CN) .......................... 202011630693.4

(51) Int. Cl.
*G01M 3/30* (2006.01)
(52) U.S. Cl.
CPC ................................... *G01M 3/30* (2013.01)
(58) Field of Classification Search
CPC .............................. G01M 3/26; G01B 11/0616
See application file for complete search history.

(56) References Cited

U.S. PATENT DOCUMENTS

| 5,838,716 A | 11/1998 | Chang |
| 10,615,085 B2 | 4/2020 | Park et al. |
| 2007/0096091 A1* | 5/2007 | Wang ................... H01L 22/12 257/E21.53 |
| 2015/0371914 A1* | 12/2015 | Ozaki .................. H01L 22/26 700/121 |
| 2019/0131191 A1* | 5/2019 | Park ..................... H01L 22/12 |

FOREIGN PATENT DOCUMENTS

| CN | 1706984 A | 12/2005 |
| CN | 1825555 A | 8/2006 |
| CN | 101271033 A | * 9/2008 |
| CN | 201689872 U | 12/2010 |
| CN | 202259222 U | * 5/2012 |
| CN | 202259222 U | 5/2012 |

(Continued)

OTHER PUBLICATIONS

International Search Report in the international application No. PCT/CN2021/095470, dated Sep. 29, 2021.

(Continued)

*Primary Examiner* — Natalie Huls
(74) *Attorney, Agent, or Firm* — SYNCODA LLC; Feng Ma

(57) ABSTRACT

A method for detecting a gas tightness of a furnace tube device includes: providing a test wafer; conveying the test wafer into the furnace tube device; depositing a dielectric layer on the test wafer; measuring a thickness and a Goodness of Fit (GOF) of the dielectric layer formed on the test wafer by a thickness measuring machine; and judging the gas tightness of the furnace tube device according to the GOF.

15 Claims, 8 Drawing Sheets

(56) References Cited

FOREIGN PATENT DOCUMENTS

| CN | 103451624 | A |   | 12/2013 |             |
|----|-----------|---|---|---------|-------------|
| CN | 103474368 | A |   | 12/2013 |             |
| CN | 104051307 | A |   | 9/2014  |             |
| CN | 105206549 | A |   | 12/2015 |             |
| CN | 105529281 | A | * | 4/2016  | H01L 21/67011 |
| CN | 105529281 | A |   | 4/2016  |             |
| CN | 109957785 | A |   | 7/2019  |             |
| CN | 110718446 | A |   | 1/2020  |             |
| CN | 115132604 | B | * | 11/2022 |             |
| TW | I290344   | B |   | 11/2007 |             |

OTHER PUBLICATIONS

First Office Action of the Chinese application No. 202011630693.4, dated Oct. 31, 2022.

* cited by examiner

METHOD FOR DETECTING GAS TIGHTNESS OF FURNACE TUBE DEVICE

CROSS-REFERENCE TO RELATED APPLICATIONS

This is a continuation of International Patent Application No. PCT/CN2021/095470 filed on May 24, 2021, which claims priority to Chinese Patent Application No. 202011630693.4 filed on Dec. 30, 2020. The disclosures of these applications are hereby incorporated by reference in their entirety.

BACKGROUND

In the manufacturing process of semiconductor structures, dielectric layers may be usually deposited on devices by Low Pressure Chemical Vapor Deposition (LPCVD). For example, when a gate structure is formed on a substrate, a tungsten metal layer is usually formed on the substrate, the substrate with the tungsten metal layer is then placed in furnace tube device, and a dielectric layer having a certain thickness deposited on the tungsten metal layer by LPCVD is used as a gate protection layer.

SUMMARY

The present disclosure relates generally to the technical field of semiconductors, and more specifically to a method for detecting gas tightness of furnace tube device.

Various embodiments of the present disclosure provide a method for detecting a gas tightness of a furnace tube device, which is used for detecting the gas tightness of the furnace tube device so as to ensure the yield of semiconductor devices manufactured by the furnace tube device.

To achieve the above object, the embodiments of the present disclosure provide the following technical solutions.

The embodiments of the present disclosure provide a method for a detecting gas tightness of a furnace tube device. The method may include following steps.

A test wafer is provided.

The test wafer is conveyed into the furnace tube device, and a dielectric layer is deposited on the test wafer.

The test wafer deposited with the dielectric layer is conveyed to a thickness measuring machine, to measure a thickness and a Goodness of Fit (GOF) of the dielectric layer.

The gas tightness of the furnace tube device is verified according to the GOF of the dielectric layer.

DETAILED DESCRIPTION

When a furnace tube device is used for preparing the dielectric layer, if the furnace tube device leaks oxygen, the oxygen permeated into the furnace tube device may react with the tungsten metal layer to form oxides, so that the resistance of the gate structure is increased, and thus the yield of semiconductor devices manufactured by a furnace tube is affected.

For example, a silicon nitride layer in a semiconductor structure is usually manufactured in furnace tube device. More specifically, when a gate structure of a memory is formed, a substrate with a tungsten metal layer is usually conveyed into the furnace tube device. $SiH_2Cl_2$ and $NH_3$ are used as precursors to form a silicon nitride layer on the tungsten metal layer by LPCVD. If the gas tightness of the furnace tube device is not good, an oxygen leakage phenomenon exists. On one hand, it is easy to cause insufficient reaction of $SiH_2Cl_2$ and $NH_3$, and fine dust particles formed on the surface of the silicon nitride layer, so that the qualification rate of the semiconductor structure is affected. On the other hand, after the tungsten metal layer is oxidized, the surface of the tungsten metal layer is roughened, so that the resistance of the formed gate structure is increased, and the yield of semiconductor devices is affected.

Various embodiments of the present disclosure provide a method for detecting a gas tightness of a furnace tube device. Before a semiconductor structure is manufactured by furnace tube device, a test wafer is conveyed into the furnace tube device, and a dielectric layer is deposited on the test wafer. Then, a thickness and a Goodness of Fit (GOF) of the dielectric layer formed on the test wafer are measured by a thickness measuring machine. The gas tightness of the furnace tube device is judged according to the GOF. If the gas tightness of the furnace tube device is good, the semiconductor structure may be normally produced by the furnace tube device, thereby ensuring that the yield of semiconductor devices manufactured by the furnace tube device can meet the requirements.

In order to make the above objects, features, and advantages of the embodiments of the present disclosure more apparent and easily understood, the technical solutions in the embodiments of the present disclosure will be clearly and completely described below with reference to the drawings in the embodiments of the present disclosure. It is apparent that the described embodiments are only a part of the embodiments of the present disclosure, but not all of the embodiments. Based on the embodiments in the present disclosure, all other embodiments obtained by those of ordinary skill in the art without involving any inventive effort fall into the scope of protection of the present disclosure.

Figure 1:
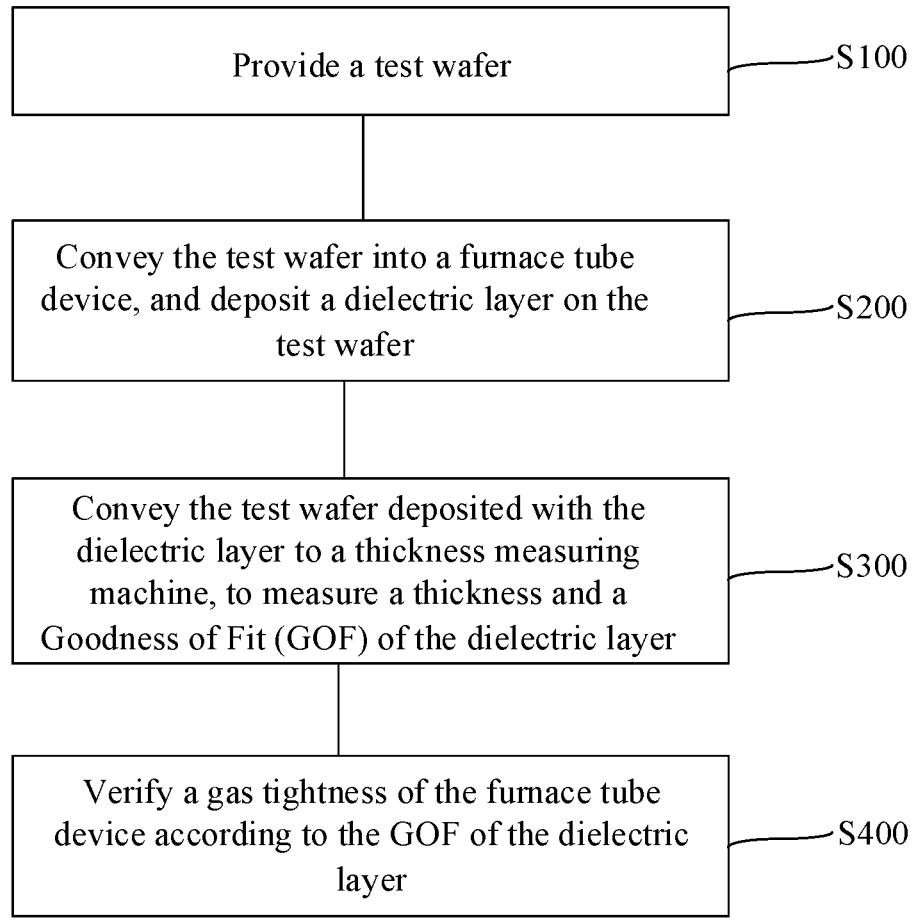
FIG. 1 is a flowchart of a method for detecting a gas tightness of a furnace tube device according to an embodiment of the present disclosure.

FIG. 1 is a flowchart of a method for detecting a gas tightness of a furnace tube device according to an embodiment of the present disclosure. FIG. 3 is a flowchart of depositing a dielectric layer on a test wafer in a method for detecting a gas tightness of a furnace tube device according to an embodiment of the present disclosure. FIGS. 2 and 4-15 are schematic structure diagrams of stages of a method for detecting a gas tightness of a furnace tube device. The method for detecting a gas tightness of a furnace tube device will be described with reference to FIGS. 1-15.

As shown in FIG. 1, the embodiments of the present disclosure provide a method for detecting a gas tightness of a furnace tube device. The method is used for judging whether the furnace tube device has the defect of oxygen leakage so as to ensure that the yield of semiconductor devices manufactured by the furnace tube device meets the requirements. The method for detecting the gas tightness of the furnace tube device includes the following steps.

In step S100, a test wafer is provided.

Figure 2:
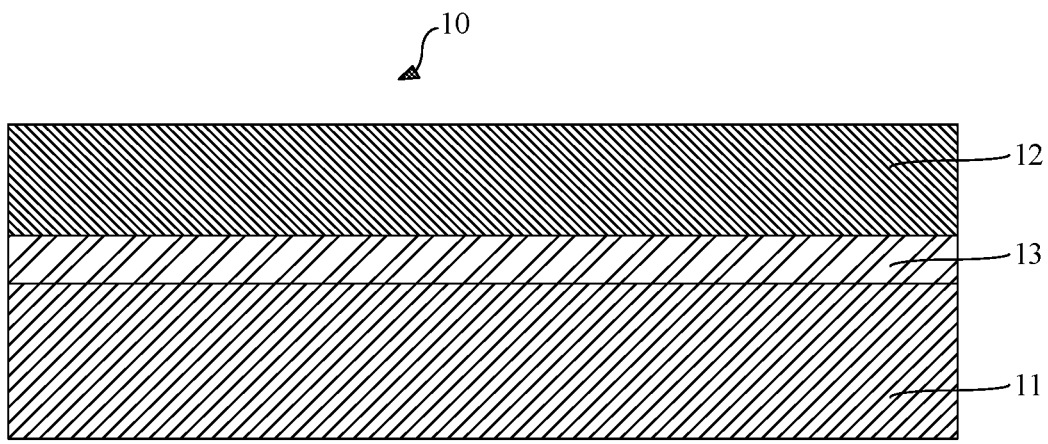
FIG. 2 is a schematic structure diagram of a test wafer in a method for detecting a gas tightness of a furnace tube device according to an embodiment of the present disclosure.
Figure 3:
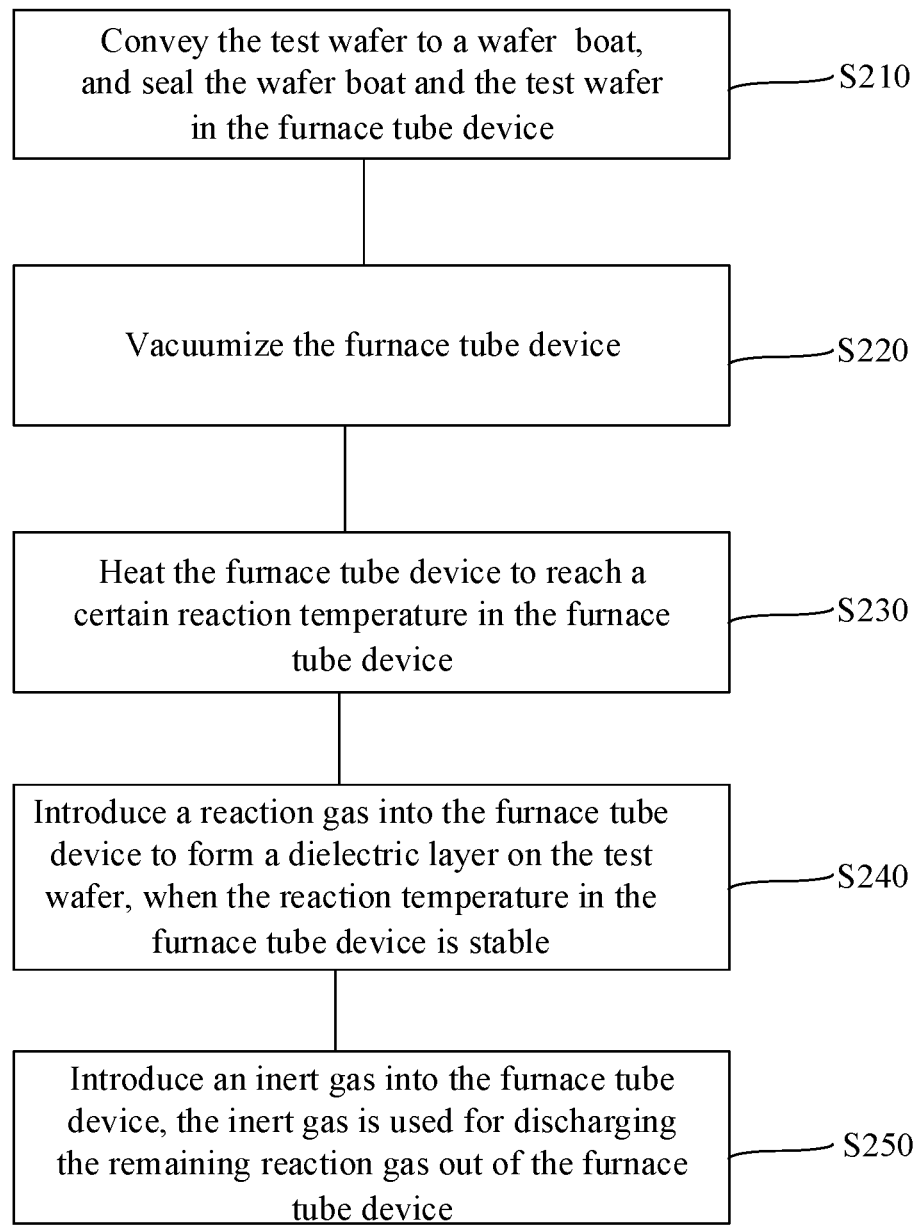
FIG. 3 is a flowchart of depositing a dielectric layer on a test wafer in a method for detecting a gas tightness of a furnace tube device according to an embodiment of the present disclosure.

Exemplarily, as shown in FIG. 2, the test wafer 10 includes a substrate 11, and an insulating layer 13 and a tungsten metal layer 12 sequentially stacked on the substrate 11.

The substrate 11, serving as a support member for the test wafer 10, is used for supporting the tungsten metal layer 12 disposed thereon and a subsequently formed dielectric layer. The substrate 11 may be made of a semiconductor material, which may be one or more of silicon, germanium, a silicon germanium compound, or a silicon carbon compound.

The tungsten metal layer 12 may be used for a conductive layer of a gate structure to realize the performance of a semiconductor structure. The tungsten metal layer 12 has a thickness of 20 nm-80 nm. The thickness of the tungsten metal layer 12 is limited in the present embodiment. If the thickness of the tungsten metal layer 12 is too small, for example, the thickness of the tungsten metal layer 12 is less than 20 nm, the gas tightness of the furnace tube device cannot be accurately measured. If the thickness of the tungsten metal layer 12 is too large, for example, the thickness of the tungsten metal layer is greater than 80 nm, the production cost of the test wafer 10 is increased.

The insulating layer 13 is disposed between the substrate 11 and the tungsten metal layer 12. An atomic layer deposition process or a chemical vapor deposition process may be adopted to form the insulating layer 13 with a certain thickness on the surface, close to the tungsten metal layer 12, of the substrate 11. The material of the insulating layer 13 may be silicon oxide. Permeation between the tungsten metal layer 12 and the substrate 11 may be prevented by the insulating layer 13, which ensures the conductivity of the tungsten metal layer 12, thereby improving the performance of the semiconductor structure.

Further, the thickness of the insulating layer 13 is 80 nm-160 nm. The thickness of the insulating layer 13 is limited in the present embodiment, so that the isolation effect of the insulating layer 13 is prevented from being affected by too small thickness of the insulating layer 13. Meanwhile, the production cost for manufacturing the insulating layer 13 is prevented from being increased by too large thickness of the insulating layer 13.

In step S200, the test wafer is conveyed into furnace tube device, and a dielectric layer is deposited on the test wafer.

As shown in FIG. 3, this step may be carried out in the following manners.

In step S210, the test wafer is conveyed to a wafer boat, and the wafer boat and the test wafer are sealed in the furnace tube device.

Figure 4:
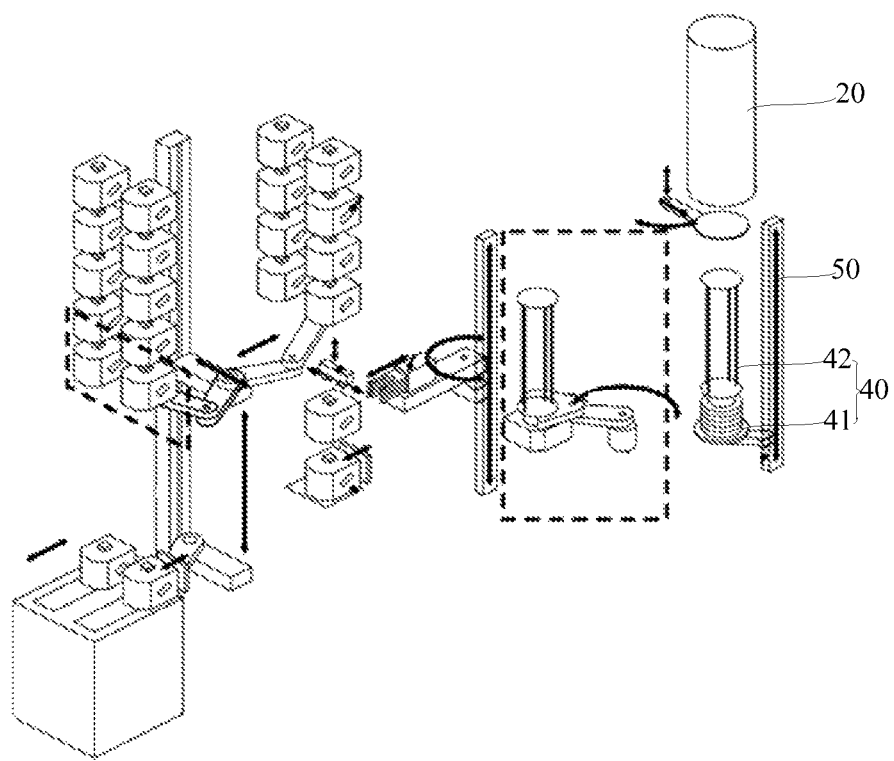
FIG. 4 is a diagram of a process of conveying a test wafer to a furnace tube device in a method for detecting a gas tightness of the furnace tube device according to an embodiment of the present disclosure.

As shown in FIG. 4, the test wafer 10 is conveyed to a wafer boat 40. That is, the test wafer 10 is installed on the wafer boat 40. The wafer boat 40 serves as a bearing component of the test wafer 10 or a normally produced product, for providing support to the test wafer 10 or the normally produced product.

Figure 5:
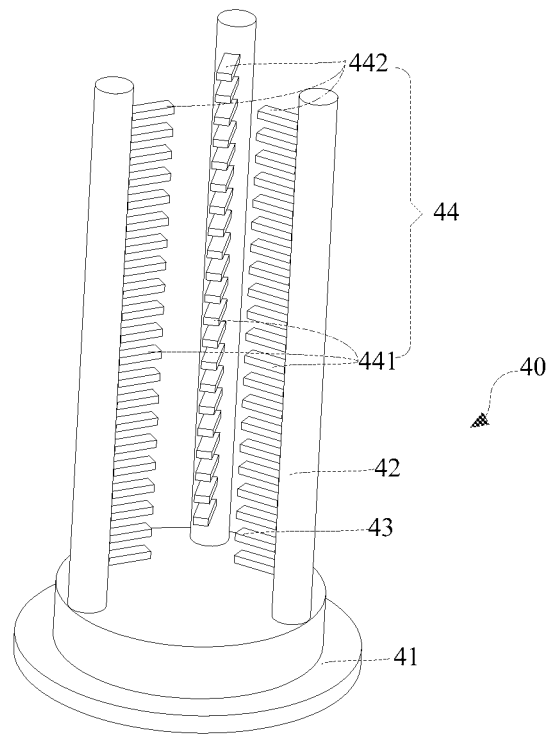
FIG. 5 is a schematic structure diagram of a wafer boat in a method for detecting a gas tightness of a furnace tube device according to an embodiment of the present disclosure.

As shown in FIG. 5, the wafer boat 40 may include a base 41 and a plurality of support posts 42 spaced apart in a circumferential direction of the base. A plurality of support protrusions 43 are provided on an inner surface of each support post 42 and are spaced apart from each other. The extension lines of multiple support protrusions 43 located on a same plane intersect at a point, and a line connecting the point with the center of the base 41 is perpendicular to a plane in which the base 41 is located.

Figure 6:
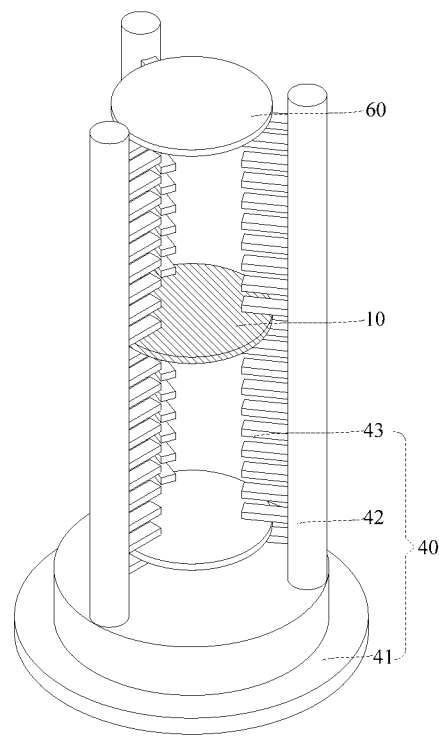
FIG. 6 is a schematic diagram of a wafer boat provided with a test wafer and a baffle in a method for detecting a gas tightness of a furnace tube device according to an embodiment of the present disclosure.

Exemplarily, as shown in FIGS. 5 and 6, three support protrusions 43 located in a same plane may constitute a protrusion component 44. That is, the three support protrusions 43 located in the same plane provide a bearing component for the test wafer 10 or a baffle 60 so that the test wafer 10 or the baffle 60 may be disposed on the protrusion component 44, and thus fixed connections between the test wafer 10 and the wafer boat 40 and between the baffle 60 and the wafer boat 40 can be achieved.

The protrusion components 44 may include a plurality of first protrusion components 441 and a plurality of second protrusion components 442. Each first protrusion component 441 is used for placing the test wafer 10. Each second protrusion component 442 is used for placing the baffle 60. The first protrusion component 441 is located between two adjacent second protrusion components 442.

That is, the test wafer 10 is located between two adjacent baffles 60, i.e., a baffle 60 is disposed above the test wafer 10 and also disposed below the test wafer 10, so that uniformity of the thickness of the dielectric layer 30 formed on the test wafer 10 can be ensured.

It is noted that the number of protrusion components of the wafer boat provided in the present embodiment is 147, and in order to simplify the structure of the wafer boat, only part of the protrusion components are shown in FIG. 5 in the present embodiment. In addition, in the present embodiment, the first protrusion component and the second protrusion component are provided in the same structure except that parts carried on the first protrusion component and the second protrusion component are different. In order to easily distinguish the parts carried on the protrusion components from each other, the present embodiment divides the protrusion components into first protrusion components for carrying the test wafers and second protrusion components for carrying the baffles.

During normal testing, it is necessary to place test wafers on all the first protrusion components and place baffles on all the second protrusion components, but in order to clearly express a positional relationship between the test wafers and the first protrusion components and a positional relationship between the baffles and the second protrusion components, only part of the test wafers and part of the baffles are shown in FIG. 6 in the present embodiment.

In order to simulate the process of normally producing a product by furnace tube device 20, the step of conveying the test wafer to the wafer boat includes the following operations.

As shown in FIGS. 7-10, a plurality of baffles 60 are provided. The plurality of baffles 60 and the plurality of test wafers 10 are conveyed to the wafer boat 40. The plurality of baffles 60 and the plurality of test wafers 10 fill entirely the protrusion components on the wafer boat 40. The plurality of baffles 60, the plurality of test wafers 10, and the wafer boat 40 constitute a test wafer cylinder 70. The material of the baffle 60 may be silicon.

The plurality of baffles 60 and the plurality of test wafers 10 are arranged on the wafer boat 40 and sequentially spaced apart, from top to bottom in an axial direction of the wafer boat 40, so that the baffles or the test wafers are placed on all the protrusion components of the wafer boat, and thus the state of the furnace tube device when the furnace tube device normally produces products can be accurately simulated.

In the present embodiment, the thickness of the dielectric layer 30 formed on the baffle 60 may be measured by a thickness measuring machine, and whether the furnace tube device 20 can produce a qualified semiconductor device may be judged according to the thickness of the dielectric layer 30 formed on the baffle 60.

In some embodiments, there may be one test wafer or multiple test wafers 10. For example, when there are multiple test wafers 10, as shown in FIG. 7, there are three test wafers 10, the three test wafers 10 are located at upper, middle, and lower portions of the test wafer cylinder 70 respectively.

It is noted that the concepts of the upper, middle, and lower portions in the present embodiment may be understood that, taking the vertical placement of the test wafer cylinder 70 as an example, the middle portion is a midpoint position of a central axis of the test wafer cylinder 70, the upper portion is a region between the midpoint position of the central axis of the test wafer cylinder 70 and a top end, and the lower portion is a region between the midpoint position of the central axis of the test wafer cylinder 70 and a bottom end.

Figure 7:
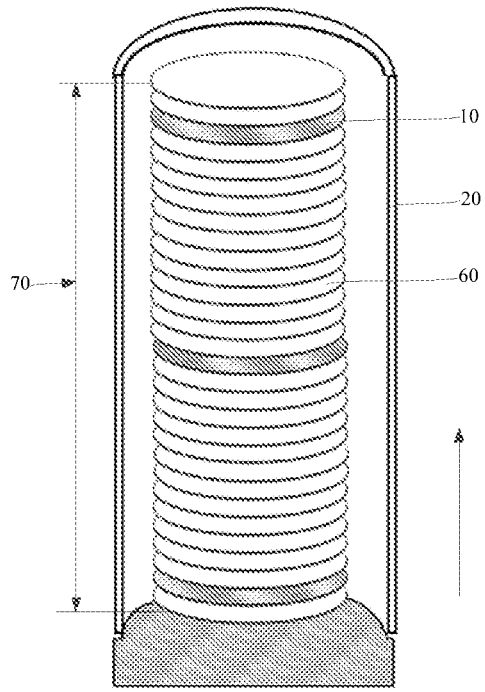
FIG. 7 illustrates a first arrangement mode of a test wafer in a method for detecting a gas tightness of a furnace tube device according to an embodiment of the present disclosure.

Taking the orientation shown in FIG. 7 as an example, as can be seen from bottom to top, the components located at the bottom and top ends of the test wafer cylinder 70 are the baffles 60, a test wafer 10 may be disposed above the first baffle 60, a plurality of baffles spaced apart and a second test wafer may be disposed above the first test wafer 10, and the second test wafer is located at the midpoint position of the central axis of the test wafer cylinder. Then, a plurality of baffles spaced apart and a third test wafer are disposed sequentially between the second test wafer and the last baffle disposed at the top end. That is, the third test wafer is located below the last baffle.

According to the embodiments of the present disclosure, three test wafers are disposed in the wafer boat, and the three test wafers are located at the upper, middle, and lower portions of the test crystal cylinder respectively, i.e., the three test wafers are uniformly distributed at upper, middle, and lower portions in the furnace tube device. In this way, the gas tightness of each position in the furnace tube device can be simultaneously detected, so that the accuracy of detecting the gas tightness of the furnace tube device can be improved.

Figure 8:
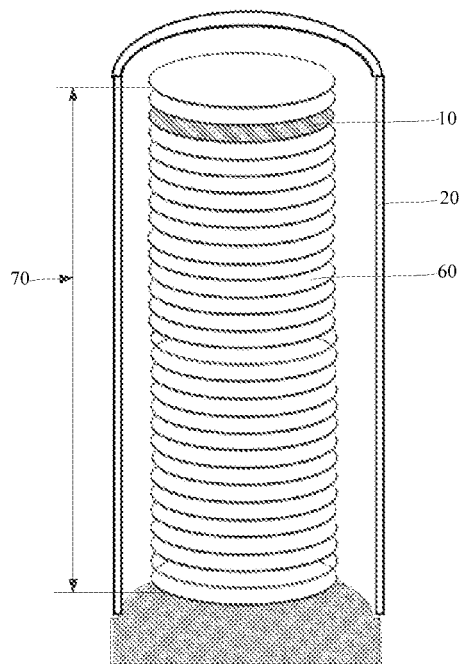
FIG. 8 illustrates a second arrangement mode of a test wafer in a method for detecting a gas tightness of a furnace tube device according to an embodiment of the present disclosure.
Figure 9:
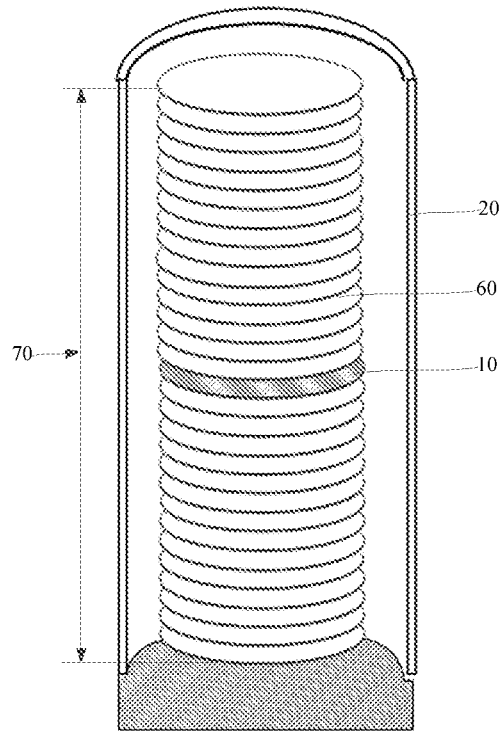
FIG. 9 illustrates a third arrangement mode of a test wafer in a method for detecting a gas tightness of a furnace tube device according to an embodiment of the present disclosure.
Figure 10:
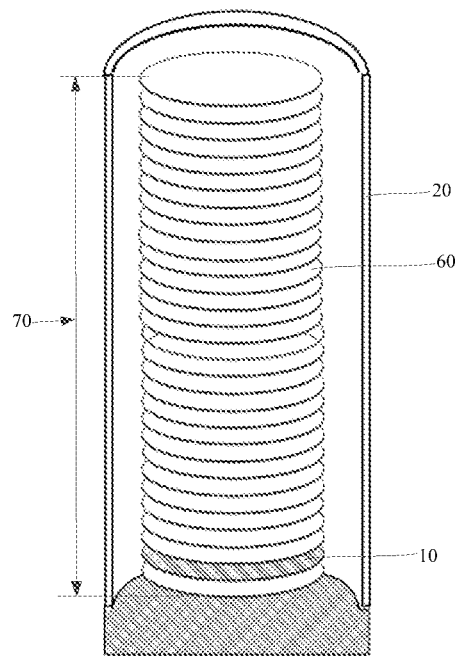
FIG. 10 illustrates a fourth arrangement mode of a test wafer in a method for detecting a gas tightness of a furnace tube device according to an embodiment of the present disclosure.

As another example, when there is one test wafer, as shown in FIG. 8, the test wafer 10 is located at an upper portion of the test wafer cylinder 70, or, as shown in FIG. 9, the test wafer 10 is located at a middle portion of the test wafer cylinder 70, or, as shown in FIG. 10, the test wafer 10 is located at a lower portion of the test wafer cylinder 70.

The situation that the test wafer is located at the upper portion of the test wafer cylinder may be construed as that the test wafer 10 may be disposed in a region between the last baffle 60 at the top end of the test wafer cylinder 70 and the midpoint position of the central axis of the test wafer cylinder 70.

The situation that the test wafer is located at the lower portion of the test wafer cylinder may be construed as that the test wafer 10 may be disposed in a region between the first baffle 60 at the bottom end of the test wafer cylinder 70 and the midpoint position of the central axis of the test wafer cylinder 70.

The present embodiment uses one test wafer to test the gas tightness of the furnace tube device, so that the number of test wafers can be reduced, and the test cost can be reduced.

In this process, in order to ensure the gas tightness of the furnace tube device, it is necessary to periodically use the test wafer to detect oxygen leakage of the furnace tube device. For example, the test wafer 10 may be disposed at the upper portion of the test wafer cylinder 70 when a first test is performed. The test wafer 10 may be disposed at the middle portion of the test wafer cylinder 70 when a second test is performed. The test wafer 10 may be disposed at the lower portion of the test wafer cylinder 70 when a third test is performed. The above mentioned three tests are called as one test cycle. Subsequent cyclic tests may be performed according to the test cycle, to ensure that the gas tightness of each position of the furnace tube device can be detected under the condition of reducing the test cost.

After the baffle 60 and the test wafer 10 are conveyed into the wafer boat 40, the wafer boat 40 installed with the test wafer 10 may be conveyed into the furnace tube device 20 by a wafer boat elevator 50, i.e., the wafer boat 40 installed with the baffle 60 and the test wafer 10 may be conveyed into the furnace tube device 20 by the wafer boat elevator 50.

Finally, the furnace tube device 20 is sealed to prevent an external gas from entering the furnace tube device 20, thereby ensuring the deposition thickness of the dielectric layer 30.

Figure 11:
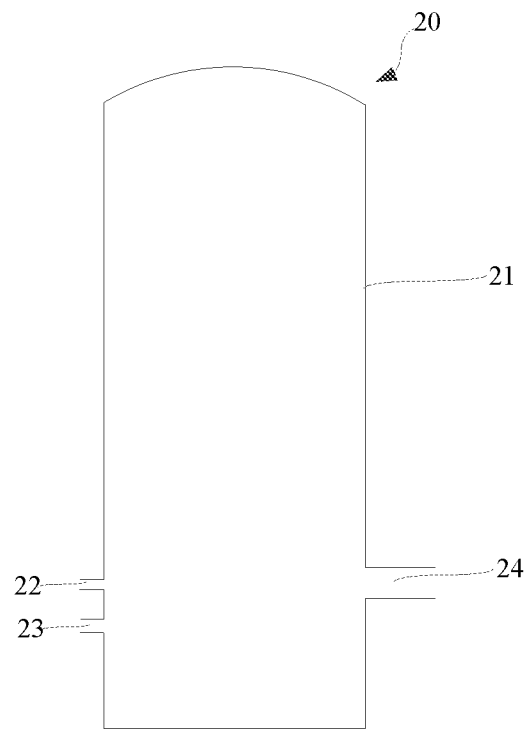
FIG. 11 is a schematic structure diagram of a furnace tube device according to an embodiment of the present disclosure.

The structure of the furnace tube device 20 provided in the present embodiment may be as shown in FIG. 11. Exemplarily, the furnace tube device 20 may include a furnace tube body 21, and a first gas inlet 22, a second gas inlet 23, and a gas outlet 24 provided on the furnace tube body 21. The first gas inlet 22 and the second gas inlet 23 are used for introducing a reaction gas into the furnace tube body 21. The gas outlet 24 is used for discharging air or fine dust particles in the furnace tube body 21.

It is noted that FIG. 11 in the present embodiment only illustrates a partial structure of the furnace tube device 20, i.e., the furnace tube device 20 may include other members in addition to the members shown in FIG. 11.

In step S220, the furnace tube device is vacuumized.

In this step, an inert gas, for example, nitrogen, may be introduced into the furnace tube device 20 through the first gas inlet 22 or the second gas inlet 23. Then, the nitrogen is sucked out through the gas outlet 24 by a sucking pump to discharge fine dust particles in the furnace tube device 20. Finally, the sucking is continued to suck the pressure in the furnace tube device 20 to a vacuum state.

It is noted that in this step, the pressure in the furnace tube device may be detected by a pressure tester disposed on the furnace tube device. Pressure change in the furnace tube device is detected to determine whether there is a leakage problem in the furnace tube device, and when there is no a leakage problem in the furnace tube device, subsequent related processes may be performed.

In step S230, the furnace tube device is heated, to reach a certain reaction temperature in the furnace tube device, so as to satisfy a dielectric layer forming condition. The reaction temperature is in the range of 500° C.-800° C.

In step S240, a reaction gas is introduced into the furnace tube device to form a dielectric layer on the test wafer, when the reaction temperature in the furnace tube device is stable.

Exemplarily, in the present embodiment, the material of the dielectric layer 30 is silicon nitride. For example, ammonia gas ($NH_3$) is introduced into the furnace tube device 20 through the first gas inlet 22, dichlorosilane ($SiH_2Cl_2$) is introduced into the furnace tube device through the second gas inlet 23, the ammonia gas ($NH_3$) and the dichlorosilane ($SiH_2Cl_2$) react in the furnace tube device to form silicon nitride ($Si_3N_4$), and the silicon nitride ($Si_3N_4$) is deposited on the test wafer 10 to constitute the dielectric layer 30.

In this step, the flow rate of the introduced ammonia gas and dichlorosilane may be monitored by a flow rate monitor in the furnace tube device to ensure that there is sufficient reaction gas in the furnace tube device to form the dielectric layer 30 with a desired thickness.

The method for detecting the gas tightness of the furnace tube device, after the step of conveying the test wafer into furnace tube device and depositing the dielectric layer on the test wafer, further includes the following operations.

In step S250, an inert gas is introduced into the furnace tube device. The inert gas is used for discharging the remaining reaction gas out of the furnace tube device, so as to prevent the excess reaction gas from leaking into the atmosphere and harming the environment and workers when the baffle 60 and the test wafer 10 are conveyed out of the furnace tube device after the dielectric layer 30 is deposited.

After the pressure in the furnace tube device is restored to atmospheric pressure, the wafer boat 40 loaded with the baffles 60 and the test wafer(s) 10 is moved out of the furnace tube device 20 by the wafer boat elevator 50 so as to perform related tests on the test wafer 10 deposited with the dielectric layer 30.

In step S300, the test wafer deposited with the dielectric layer is conveyed to a thickness measuring machine, to measure the thickness and the GOF of the dielectric layer.

The thickness measuring machine may include a housing, and a bearing member, a light source, and a detection member disposed within the housing. The bearing member is used for bearing the test wafer formed with the dielectric layer, and the light source is disposed above the bearing member and used for emitting incident light. The detection member is used for receiving reflected light formed after being reflected by the test wafer formed with the dielectric layer, so as to obtain an actual thickness value of the dielectric layer.

The detection member also performs fitting according to a theoretical thickness value of the dielectric layer 30 and the actual thickness value of the dielectric layer 30 to obtain a GOF.

The detection member may calculate the GOF according to the following formula:

$$GOF = 1 - \frac{2}{\pi}\arctan\sqrt{\frac{x^2}{400}}$$

$x^2$ is a standard deviation of the measured actual thickness value of the dielectric layer.

It is noted that the GOF of the dielectric layer is a matching degree value between an actual measurement spectrum measured by the thickness measuring machine and a theoretical measurement spectrum simulated by the thickness measuring machine.

In this process, both the actual measurement spectrum and the theoretical measurement spectrum may be calculated by using software of the thickness measuring machine, and the software is the prior art and thus its detailed descriptions are omitted herein in the present embodiment.

In order to improve the accuracy of the GOF, the thickness of the dielectric layer is also limited in the embodiments of the present disclosure. For example, the thickness of the dielectric layer is in the range of 50 nm-150 nm.

If the thickness of the dielectric layer 30 is too small, when the thickness of the dielectric layer 30 is measured in a subsequent process, an error in measuring the thickness of the dielectric layer 30 is increased, and the accuracy of the obtained GOF is affected. In addition, if the thickness of the dielectric layer 30 is too large, the amount of the reaction gas is increased, and the production cost is increased.

Therefore, in the embodiments of the present disclosure, the thickness of the dielectric layer 30 is limited, in such a way that not only the thickness of the dielectric layer 30 is prevented from being too small, but also the thickness of the dielectric layer 30 is prevented from being too large. Thus, the production cost can be reduced while the accuracy of the tested GOF is ensured.

In step S400, the gas tightness of the furnace tube device is verified according to the GOF of the dielectric layer.

Figure 12:
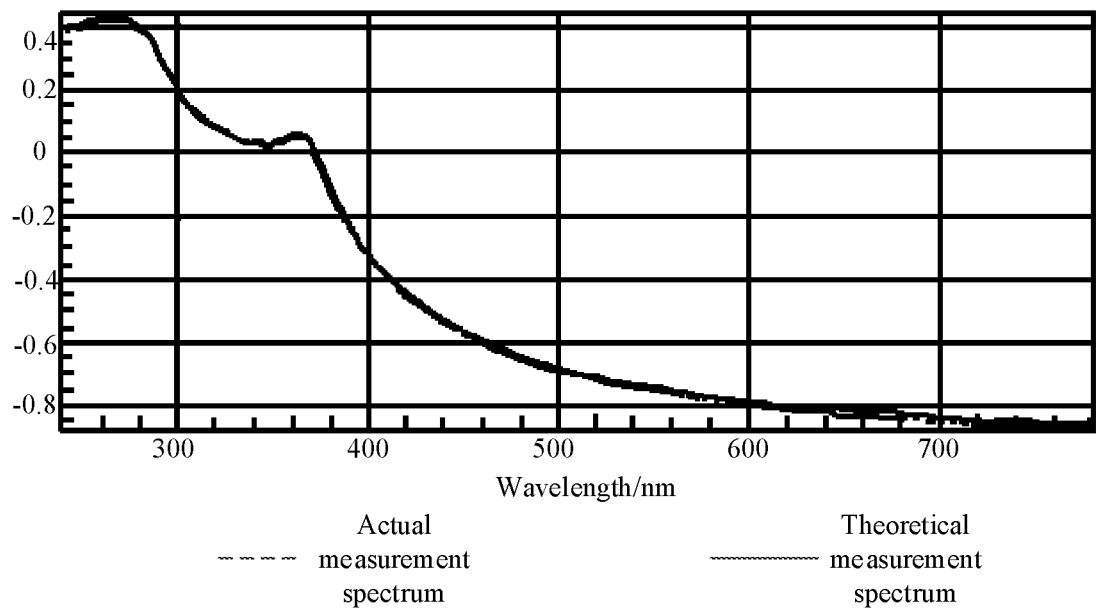
FIG. 12 is a first schematic diagram of measuring GOF in a method for detecting a gas tightness of a furnace tube device according to an embodiment of the present disclosure.
Figure 13:
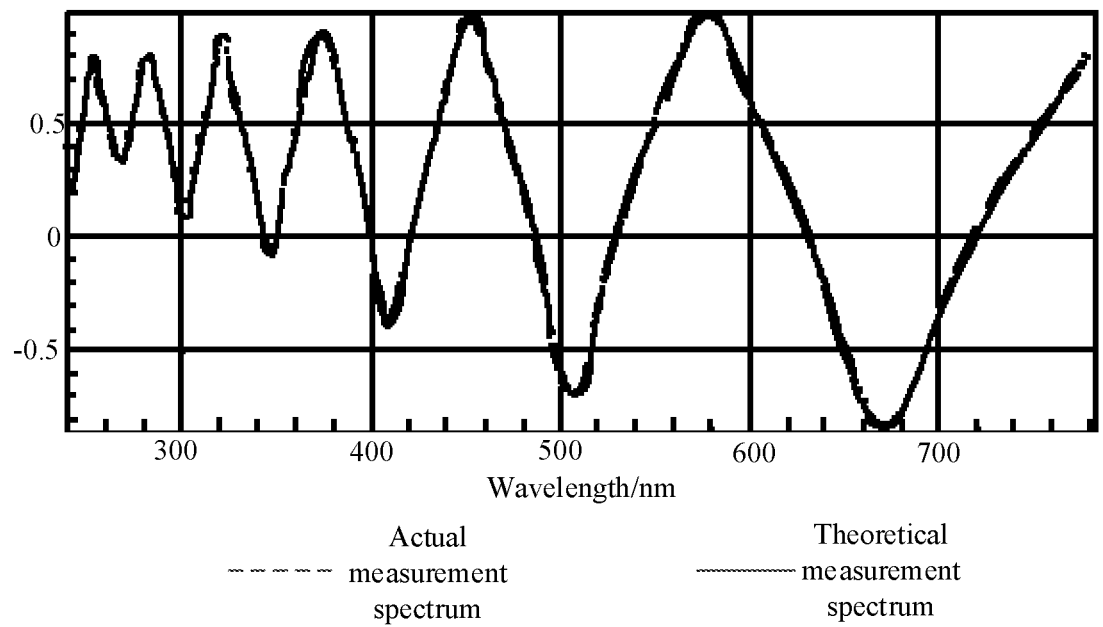
FIG. 13 is a second schematic diagram of measuring GOF in a method for detecting a gas tightness of a furnace tube device according to an embodiment of the present disclosure.
Figure 14:
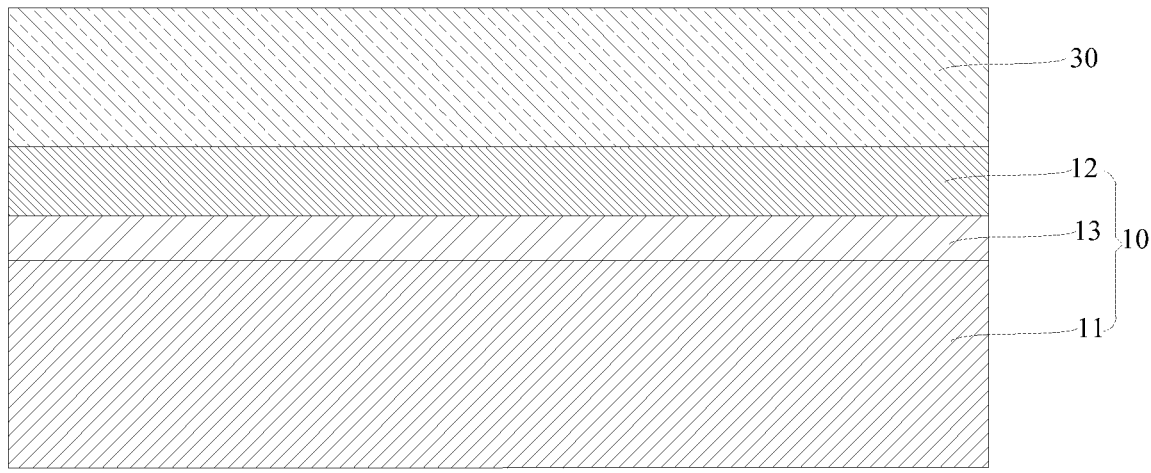
FIG. 14 is a schematic structure diagram of a dielectric layer formed under the condition of good gas tightness according to an embodiment of the present disclosure.

Exemplarily, as shown in FIGS. 12 and 13, when the GOF is in the range of 0.95-1, it indicates that the gas tightness of the furnace tube device 20 meets the requirements. That is, the furnace tube device 20 does not have an oxygen leakage phenomenon, the tungsten metal layer 12 is not oxidized, and the surface of the tungsten metal layer is not uneven. The morphology of the formed product is shown in FIG. 14.

Figure 15:
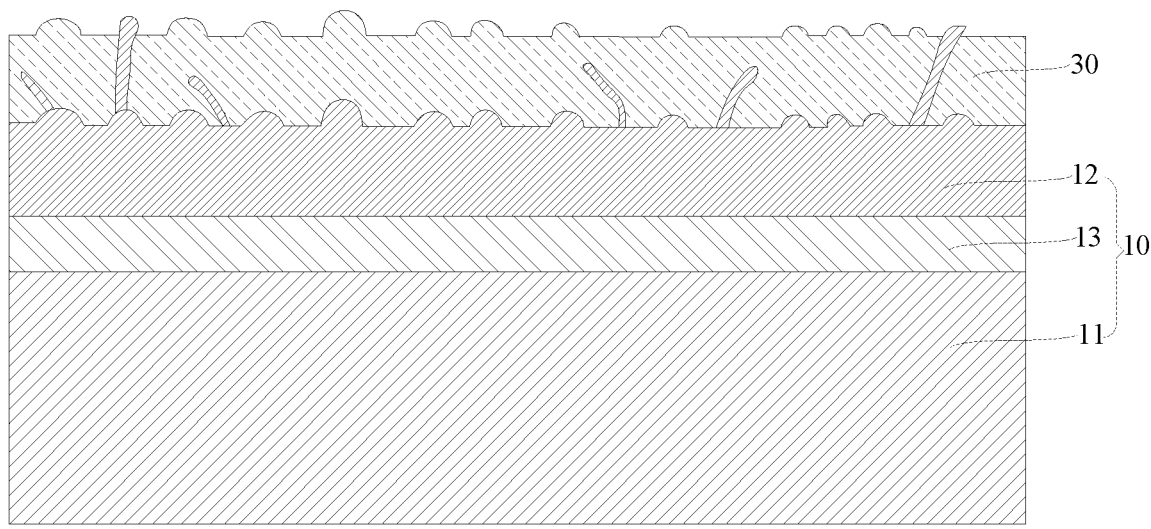
FIG. 15 is a schematic structure diagram of a dielectric layer formed under the condition of bad gas tightness according to an embodiment of the present disclosure.

When the GOF is less than 0.95, it indicates that the gas tightness of the furnace tube device 20 does not meet the requirements. That is, the furnace tube device 20 has an oxygen leakage phenomenon, the tungsten metal layer 12 will be oxidized, and the surface of the tungsten metal layer is uneven. The morphology of the formed product is shown in FIG. 15. In this case, the furnace tube device 20 needs to be overhauled to ensure that the yield of semiconductor devices manufactured by the furnace tube device meets the requirements.

In the method for detecting the gas tightness of the furnace tube device provided by the embodiments of the present disclosure, before a semiconductor structure is manufactured by furnace tube device, a test wafer is conveyed into the furnace tube device, and a dielectric layer is deposited on the test wafer. Then, the thickness and GOF of the dielectric layer formed on the test wafer are measured by a thickness measuring machine. The gas tightness of the furnace tube device is judged according to the GOF. When the gas tightness of the furnace tube device is good, the semiconductor structure may be normally produced by the furnace tube device, and thus the performance of the semiconductor structure manufactured by the furnace tube device and the qualification rate of the semiconductor structure can be ensured.

The embodiments or implementations described in this specification are described in a progressive manner. Each embodiment highlights differences from the other embodiments, and the same or similar part among the various embodiments can be refereed to each other.

In the descriptions of this specification, the description with reference to the terms "one implementation", "some implementations", "schematic implementations", "example", "specific example", or "some examples", etc. means that particular features, structures, materials, or characteristics described in conjunction with the implementation or example are included in at least one implementation or example of the present disclosure.

In this specification, schematic representations of the above terms do not necessarily refer to the same implementation or example. Furthermore, the features, structures, materials, or characteristics particularly described may be combined into any one or more implementations or examples in any suitable manner.

Finally, it is noted that the above embodiments are merely used to illustrate the technical solutions of the present disclosure and are not intended for limiting thereof. Although the present disclosure has been described in detail with reference to the foregoing embodiments, those of ordinary skill in the art will appreciate that the technical solutions of the foregoing embodiments may still be modified, or some or all of the technical features thereof may be equivalently replaced. These modifications or replacements do not make the essence of the corresponding technical solutions depart from the scope of the technical solutions of the various embodiments of the present disclosure.

What is claimed is:

1. A method for detecting a gas tightness of a furnace tube device, comprising:
   providing a test wafer;
   conveying the test wafer into the furnace tube device, and depositing a dielectric layer on the test wafer;
   conveying the test wafer deposited with the dielectric layer to a thickness measuring machine, to measure a thickness and a Goodness of Fit (GOF) of the dielectric layer; and
   verifying the gas tightness of the furnace tube device according to the GOF of the dielectric layer,
   wherein the test wafer comprises:
   a substrate; and
   a tungsten metal layer formed on the substrate.

2. The method for detecting the gas tightness of the furnace tube device of claim 1, wherein
   the GOF of the dielectric layer is a matching degree value between an actual measurement spectrum measured by the thickness measuring machine and a theoretical measurement spectrum simulated by the thickness measuring machine.

3. The method for detecting the gas tightness of the furnace tube device of claim 1, wherein the verifying the gas tightness of the furnace tube device according to the GOF of the dielectric layer comprises:
   when the GOF is in the range of 0.95-1, it indicates that the gas tightness of the furnace tube device meets requirements; and
   when the GOF is less than 0.95, it indicates that the gas tightness of the furnace tube device does not meet requirements.

4. The method for detecting the gas tightness of the furnace tube device of claim 1, wherein the tungsten metal layer has a thickness of 20 nm-80 nm.

5. The method for detecting the gas tightness of the furnace tube device of claim 1, wherein the test wafer further comprises:
   an insulating layer, located between the substrate and the tungsten metal layer.

6. The method for detecting the gas tightness of the furnace tube device of claim 5, wherein the insulating layer has a thickness of 80 nm-160 nm.

7. The method for detecting the gas tightness of the furnace tube device of claim 1, wherein the conveying the test wafer into the furnace tube device and depositing the dielectric layer on the test wafer comprises:
   conveying the test wafer to a wafer boat, and sealing the wafer boat and the test wafer in the furnace tube device;
   vacuumizing the furnace tube device;
   heating the furnace tube device, to reach a certain reaction temperature in the furnace tube device; and
   introducing a reaction gas into the furnace tube device to form the dielectric layer on the test wafer, when the reaction temperature in the furnace tube device is stable.

8. The method for detecting the gas tightness of the furnace tube device of claim 7, after the conveying the test wafer into furnace tube device and depositing the dielectric layer on the test wafer and before the step of conveying the test wafer deposited with the dielectric layer to the thickness measuring machine, further comprising:
   introducing an inert gas into the furnace tube device, the inert gas being used for discharging the remaining reaction gas out of the furnace tube device.

9. The method for detecting the gas tightness of the furnace tube device of claim 8, wherein a material of the dielectric layer is silicon nitride.

10. The method for detecting the gas tightness of the furnace tube device of claim 8, wherein the dielectric layer has a thickness of 50 nm-150 nm.

11. The method for detecting the gas tightness of the furnace tube device of claim 7, prior to the conveying the test wafer to the wafer boat, further comprising:
    conveying a plurality of baffles to the wafer boat, the wafer boat comprising a plurality of protrusion components spaced apart, each protrusion component being provided with the baffle or the test wafer thereon, and the baffle, the test wafer and the wafer boat constituting a test wafer cylinder.

12. The method for detecting the gas tightness of the furnace tube device of claim 11, wherein the protrusion components comprise first protrusion components and second protrusion components, the first protrusion component being located between two of the second protrusion components, and wherein the first protrusion component is configured for placing the test wafer and the second protrusion component is configured for placing the baffle.

13. The method for detecting the gas tightness of the furnace tube device of claim 11, wherein there are three test wafers, and the three test wafers are located at an upper portion, a middle portion, and a lower portion of the test wafer cylinder respectively.

14. The method for detecting the gas tightness of the furnace tube device of claim 11, wherein there is one test wafer, and wherein the one test wafer is located at an upper portion of the test wafer cylinder, or located at a middle portion of the test wafer cylinder, or located at a lower portion of the test wafer cylinder.

15. The method for detecting the gas tightness of the furnace tube device of claim 11, wherein a material of the baffle is silicon.

\* \* \* \* \*